United States Patent
Straughn et al.

[15] 3,653,916
[45] Apr. 4, 1972

[54] PROCESS FOR PRODUCING AN ONION FLAVORED SNACK

[72] Inventors: Robert O. Straughn; Richard D. Reinhart, both of Minneapolis, Minn.

[73] Assignee: General Mills, Inc.

[22] Filed: Dec. 29, 1969

[21] Appl. No.: 888,814

[52] U.S. Cl. ..................................................99/81
[51] Int. Cl. ............................................A231 1/18
[58] Field of Search ...........................99/81, 82, 83

[56] References Cited

UNITED STATES PATENTS 3,484,250  12/1969  Vollink et al. ..............................99/83
3,540,890  11/1970  Benson ......................................99/83
3,544,332  12/1970  Leebens.....................................99/83

Primary Examiner—Raymond N. Jones
Attorney—Anthony A. Juettner and Norman P. Friederichs

[57] ABSTRACT

Preparing a puffed snack product by blending dry ingredients including a meal, onion flavoring and sugar. Sufficient water is added to the blend to raise the total moisture content, by weight, to between 13 and 15 percent. The mixture is tempered for between one-half hour and 8 hours. The mixture is treated in a collet extruder where the temperature is raised to between 255° and 310° F. and the pressure is between 950 and 1,350 pounds per square inch gauge. The mixture expands upon extrusion and is cut into pieces which are toasted and enrobed with an edible oil and salt.

6 Claims, No Drawings

PROCESS FOR PRODUCING AN ONION FLAVORED SNACK

BACKGROUND OF THE INVENTION

The present invention relates to a new and improved method for producing a snack product, and more particularly it relates to a method for extrusion puffing of a snack product using a collet extruder.

The food products which are sold in the general category of snack items are many and varied, typically including such things as chips (e. g. potato chips and corn chips), puffs (e.g., corn puffs), etc. Snack items account for a large dollar volume in the food industry. Generally, snack items are eaten apart from a regular meal. Often different snack items are served at the same time.

People generally regard these snacks rather discriminatingly. A person will sample the various snacks in a leisurely manner centering his choice on those snacks which have some sort of special appeal. Manufacturers of snacks have done considerable work in developing refinements in their established products. A good deal of creative effort also has been directed toward making new snack products which are distinctive in some regard.

The present invention relates to a method for producing a new puff-type snack product which resembles an onion ring. In the past, onion rings typically have been prepared by slicing fresh onions, separating the layers thereby providing fresh rings of onions, dipping the fresh rings in a batter, rolling the batter coated rings in bread crumbs or cracker crumbs, sometimes repeating the dipping and rolling steps, deep fat frying and finally coating with flavoring material such as salt. Such french fired onion rings are delicious snacks if properly prepared; however, they have certain inherent disadvantages. For example, the fresh onions, as well as the french fried onion rings provide a stability problem. Also, the process is complex which is particularly disadvantageous in the case of mass production. It is also very difficult to control the oil content of such french fried onion rings.

The present invention overcomes the stated disadvantages of the known method of making french fried onion rings. The present invention provides a method for producing an onion ring type of snack by mixing and extruding a formulated mixture using a collet extruder. Various snacks have been produced in the past using a collet extruder; however, such known methods have not utilized a formulated feed mixture. In other words, the known methods of collet extrusion have extruded only a mixture of water and flour or meal. In developing the present invention it was discovered that a formulated feed mixture could be extruded using a collet extruder providing a feed mixture the processing conditions are very closely controlled, particularly temperature, pressure and water content.

The process of the present invention may be carried out using conventional collet extrusion equipment, such as that disclosed in U.S. Pat. No. 3,358,582, having provision for controlling the temperature of the extrusion barrel and in turn the temperature of the formulated feed mixture during the time the mixture is in the collet extruder. The collet extruder normally will include a housing with a flighted bore or screw chamber therein and a flighted screw disposed in the screw chamber. A head plate including a die will be disposed at the forward end of the screw chamber and driving means such as an electric motor will be located at the rear end of the screw. The collet extruder will usually also include a hopper for feeding the formulated mixture to the screw chamber.

The mixture used in carrying out the method of the present invention is prepared from a dry blend including 90 to 95 parts flour, 4.75 to 5.75 parts onion flavoring and up to 5 parts sugar by weight based on total weight of the dry blend. The onion flavoring is preferably agglomerated onion powder having a particle size such that all or nearly all would pass through a U. S. No. 20 Sieve and 10 percent or less would pass through a U. S. No. 100 Sieve. If desired, food coloring may be added to the dry blend. The materials may be blended using a conventional ribbon mixer. The meal, for example, may be corn grits, rice meal or the like. If desired, such meal may be mixed with a high protein material such as soy grits, peanut flour or the like. The meal preferably has a particle size such that all or nearly all would pass through a No. 20 sieve and 6 percent or less would pass through a U. S. No. 40 sieve. The meal is preferably corn grits and has a moisture content of up to 10 percent, generally between 7 and 9 percent by weight of the corn grits. Moisture is added to the dry blend in an amount sufficient to raise the total moisture content to between 13 and 15 percent, preferably, 13.5 to 14 percent by weight based on the total weight of the formulated mixture. The mixture is then permitted to temper or in other words set for at least ½ hour, generally about 1½ to 2 hours and in any event less than 8 hours before treating it in the collet extruder.

The mixture next is passed through a collet extruder where the mixture is worked. The pressure exerted by the screw on the mixture should be between 950 and 1350 pounds per square inch gauge as the mixture approaches the die. The temperature of the mixture rises as the mixture is worked and the pressure is applied. The temperature of the mixture should be maintained at or below 310° F. during treatment in the collet extruder. The temperature of the mixture approaching the die is between 255° and 310° F., preferably between 280° and 300° F. The mixture is extruded in the desired shape, such as ring-shaped, and expands or puffs between 8 and 16 times, preferably between 10 and 14 times, its original volume. The puffed product is then cut into short pieces, for example, one-fourth inch in length.

The puffed cut rings are next toasted, for example, at 350° F. to dry the rings to a moisture content of about 2 per cent or less. The toasting process gives the onion rings a crisp texture. The onion rings are then enrobed with an edible oil, such as coconut oil, and salted. The final product may contain about 35% oil and about 2.5% salt. The product has an excellent french fried onion flavor, even through it has not been french fried. The product also has an excellent crunchy texture and good mouth disappearance without the gummy quality which characterizes the previously known collet snacks.

EXAMPLE I

A snack was prepared according to the method of the present invention by dry blending, by weight, 91½ parts of corn grits*(*The corn grits had a moisture content of between 7 and 9 percent and had the following sieve specifications: 0 percent retained on U.S. No. 20 Sieve, between 30 and 60 percent retained on U.S. No. 30 Sieve, between 40 and 60 percent retained on U.S. No. 40 Sieve, a maximum of 5 percent retained on U.S. No. 50 Sieve and a maximum of 1 percent through a U.S. No. 50 Sieve.), 5½ parts of agglomerated onion powder, 3 parts sugar and small amount of food coloring. Water was added to the dry blend to bring the total moisture content up to 13½ percent by weight. The materials were mixed to form a homogeneous mixture using a ribbon blender for about 10 minutes. The resulting mixture was then set aside of 1½ hours. The mixture was next fed to a collet extruder having a bore with an internal diameter of about 3 inches and an effective working length of about 3 inches or in other words a length to diameter ratio of 1:1. The clearance between the screw and the barrel was about 0.036 ± 0.005 inches. The extruder was provided with a cooling jacket. The mixture entering the tubular die was maintained at a temperature of 265° F. and a pressure of 1150 p.s.i.g. The mixture passed through the collet extruder at the rate of 1.85 pounds per minute. The extrudate expanded about 12 times upon extrusion. The expanded product was cut into rings having walls about one-fourth inch in length. The rings were toasted in an oven for 2 minutes at 350° F. during which time the air in the oven was rapidly circulated. The rings were then enrobed with coconut oil in a tumbling enrober at 120° F. The product was crisp and had a taste much like that of french fried onion rings.

EXAMPLE II

A snack was prepared as described in Example I except that the moisture content of the mixture was adjusted to 14½ percent. The pressure exerted on the mixture at the die was 1000 p.s.i.g. and the temperature of the mixture at the die was 270° F. The product resembled a french fried onion ring, had an excellent taste and an excellent crisp structure.

The embodiments of the invention in which an exclusive property or privilege is claimed are defined as follows:

1. The method for preparing a puffed onion-flavored snack product said method comprising: dry blending a mixture including by weight 90 to 95 percent meal, 4.75 to 5.75 percent onion flavoring and up to 5 percent sugar; mixing sufficient water with said dry blend to raise the total moisture content to between 13 and 15 percent, by weight; tempering the resulting mixture for between one-half hour and 8 hours; working the tempered mixture in an extruder under a controlled temperature of up to 310° F.; adjusting the mixture to a temperature in the range of between 255° and 310° F. and a pressure in the range of between 950 and 1350 pounds per square inch gauge and then extruding and puffing the mixture; cutting the extruded mixture into pieces, toasting the pieces and enrobing the pieces with an edible oil and salt.

2. The method of claim 1 wherein the working and extrusion of the mixture is carried out using a collet extruder and wherein the meal is corn grits having a moisture content of up to 10 percent by weight.

3. The method of claim 2 wherein said temperature range is between 280° and 300° F. and said pressure range is between 1,000 and 1,200 pounds per square inch gauge.

4. The method of claim 3 wherein said dry blend comprises by weight about 92 percent corn grits, 5 percent onion powder and 3 percent sugar.

5. The method of claim 4 wherein said puffed snack product expands between 10 and 14 times upon extrusion.

6. A method for preparing a puffed snack product resembling an onion ring, said method comprising:

dry blending a mixture including by weight 90 to 95 percent meal, 4.75 to 5.75 percent onion flavoring and up to 5 percent sugar;

mixing sufficient water with said dry blend to raise the total moisture content to between 13 and 15 percent, by weight;

tempering the resulting mixture for between one-half hour and 8 hours working the tempered mixture in an extruder under a controlled temperature of up to 310° F.;

adjusting the mixture to a temperature in the range of between 255 and 310°F. and a pressure in the range of between 950 and 1350 pounds per square inch gauge and then extruding and puffing the mixture into the shape of a tube;

cutting the extruded tube into ring-shaped pieces; and toasting the pieces and enrobing the pieces with an edible oil and salt.

* * * * *